(12) United States Patent
Smith

(10) Patent No.: US 12,122,038 B1
(45) Date of Patent: Oct. 22, 2024

(54) TRUCK HITCH EXTENSION POLE MANIPULATOR

(71) Applicant: Kim Smith, Washburn, TN (US)

(72) Inventor: Kim Smith, Washburn, TN (US)

( * ) Notice: Subject to any disclaimer, the term of this patent is extended or adjusted under 35 U.S.C. 154(b) by 0 days.

(21) Appl. No.: 18/663,660

(22) Filed: May 14, 2024

Related U.S. Application Data

(60) Provisional application No. 63/502,193, filed on May 15, 2023.

(51) Int. Cl.
*B25J 1/04* (2006.01)
*B25J 15/06* (2006.01)
*B60D 1/58* (2006.01)

(52) U.S. Cl.
CPC ............. *B25J 1/04* (2013.01); *B25J 15/0608* (2013.01); *B60D 1/58* (2013.01)

(58) Field of Classification Search
CPC ........... B25J 1/04; B25J 15/0608; B60D 1/58; B25D 1/04; B25D 1/16
USPC ................................................. 294/65.5, 175
See application file for complete search history.

(56) References Cited

U.S. PATENT DOCUMENTS

| | | | | | |
|---|---|---|---|---|---|
| 2,993,723 | A | * | 7/1961 | Twachtman | H01F 7/0257 294/65.5 |
| 3,582,123 | A | * | 6/1971 | Kyser | H01F 7/0257 294/65.5 |
| D311,482 | S | * | 10/1990 | Morton | D8/51 |
| D378,337 | S | * | 3/1997 | Reynolds | D8/14 |
| 5,810,409 | A | * | 9/1998 | Hardie | B25B 9/00 294/65.5 |
| 5,823,592 | A | * | 10/1998 | Kalidindi | B25J 1/04 294/24 |
| 7,416,233 | B2 | * | 8/2008 | Hinson | B62D 53/068 280/149.2 |
| 2004/0012215 | A1 | * | 1/2004 | Chang | B25B 9/00 294/65.5 |
| 2007/0080550 | A1 | * | 4/2007 | Nuriddin | B62D 53/0857 294/82.11 |
| 2012/0019018 | A1 | * | 1/2012 | Malaga | A47F 13/06 294/190 |

* cited by examiner

*Primary Examiner* — Paul T Chin
(74) *Attorney, Agent, or Firm* — Pitts Lake, LLC

(57) ABSTRACT

A truck hitch extension pole manipulator includes an elongated body with a proximal end and a distal end. The distal end generally encompasses a handle, and the proximal end generally includes a "keeper" module configured to interact with, for example, a locking pin on a truck hitch. Devices according to embodiments of the present general inventive concept enable users to remove and/or insert a locking pin for a truck hitch without requiring the user to enter the bed of the truck.

17 Claims, 4 Drawing Sheets

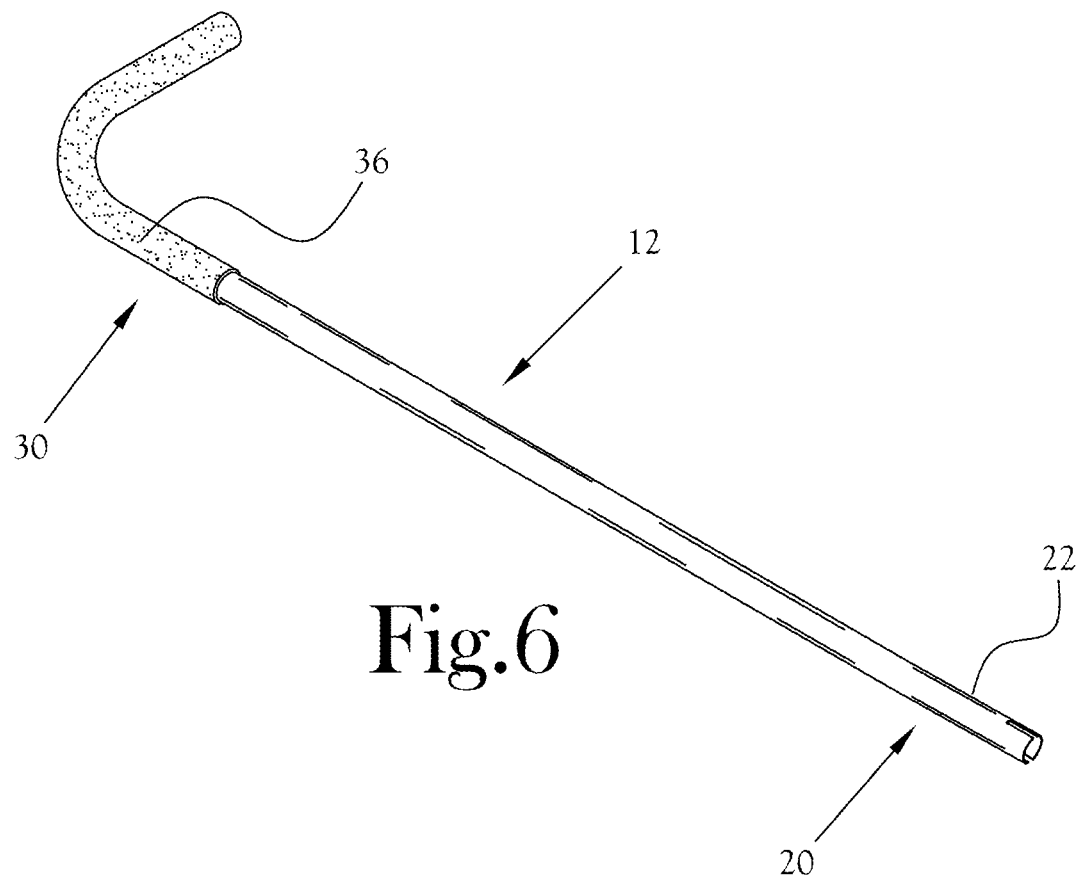

TRUCK HITCH EXTENSION POLE MANIPULATOR

CROSS-REFERENCE TO RELATED APPLICATIONS

This Application claims the benefit of the filing date of U.S. Provisional Patent Application Ser. No. 63/502,193, filed May 15, 2023, the entire content of which is herein incorporated.

STATEMENT REGARDING FEDERALLY SPONSORED RESEARCH OR DEVELOPMENT

Not Applicable

BACKGROUND OF THE INVENTION

The present invention pertains generally to tools configured for working with a truck hitch and, more particularly, to arm-extension tools adapted to interact with a truck hitch for hauling a recreational vehicle.

A need is felt for device that enables a user to remove and/or insert a locking pin for a truck hitch without requiring the user to enter the bed of the truck, climb over the side of the truck, or use a step ladder.

SUMMARY OF THE INVENTION

Disclosed herein are various example embodiments of the present general inventive concept.

Thus, in some example embodiments of the present general inventive concept, a truck hitch extension pole manipulator comprises an elongated body with a proximal end and a distal end, the proximal end including a keeper module configured to interact with a locking pin on a truck hitch; the keeper module including a raised lip partially or mostly surrounding a recessed cavity, with a magnet positioned at the base of the recessed cavity, the raised lip including two segments and separated from one another by two crenellations on opposing sides of the raised lip.

In some embodiments of the present general inventive concept, a truck hitch extension pole manipulator comprises an elongated body with a proximal end and a distal end, the proximal end including a keeper module configured to interact with a locking pin on a truck hitch, the keeper module including a raised lip partially or mostly surrounding a recessed cavity, with a magnet positioned at the base of the recessed cavity, the magnet configured to interact with the locking pin, the raised lip including two segments separated from one another by two crenellations on opposing sides of the raised lip.

In some embodiments, the magnet is configured to engage with a round wire attached to the locking pin of the truck hitch.

In some embodiments, the segments of the raised lip of the keeper module are configured to engage with a round wire attached to the locking pin of the truck hitch.

In some embodiments, the segments of the raised lip of the keeper module have a width sufficient to receive a diameter of the round wire attached to the locking pin of the truck hitch.

In some embodiments, the keeper module includes components that include rubber.

In some embodiments, the keeper module includes components fabricated from an elastic material.

In some embodiments, the elongated body includes a bend proximate the keeper module, the bend configured to configured to assist a user in positioning the keeper module proximate the locking pin.

In some embodiments of the present general inventive concept, a truck hitch extension pole manipulator includes an elongated rod with a proximal end and a distal end, the proximal end including a keeper module configured to interact with a locking pin on a truck hitch, the keeper module including a raised lip partially or mostly surrounding a recessed cavity, with a magnet positioned near the base of the recessed cavity, the magnet configured to engage with the locking pin, the raised lip including two segments separated from one another by two crenellations of the raised lip.

In some embodiments, the elongated rod includes a bend proximate the keeper module, the bend configured to configured to assist a user in positioning the keeper module proximate the locking pin.

In some embodiments, the bend is approximately 15 degrees.

In some embodiments, the bend is less than 16 degrees.

In some embodiments, the bend is approximately 10 degrees.

In some embodiments, the bend is between approximately 10 degrees and approximately 13 degrees.

In some embodiments, the bend is between approximately 10 degrees and approximately 14 degrees.

The truck hitch extension pole manipulator of claim 8, wherein the magnet is configured to engage with a round wire attached to the locking pin of the truck hitch.

The truck hitch extension pole manipulator of claim 8, wherein the segments of the raised lip of the keeper module are configured to engage with a round wire attached to the locking pin of the truck hitch.

In some embodiments, the segments of the raised lip of the keeper module have a width sufficient to receive a diameter of the round wire attached to the locking pin of the truck hitch.

In some embodiments, the keeper module includes components that include rubber.

In some embodiments, the keeper module includes components fabricated from an elastic material.

In some embodiments of the present general inventive concept, a method for removing a locking pin from a truck hitch includes providing a truck hitch extension pole manipulator including an elongated rod with a proximal end and a distal end, the proximal end including a keeper module configured to interact with the locking pin, the keeper module including a raised lip partially or mostly surrounding a recessed cavity, with a magnet positioned near the base of the recessed cavity, the magnet being configured to engage with the locking pin, the raised lip including two segments and separated from one another by two crenellations of the raised lip; positioning the truck hitch extension pole manipulator such that a keeper module is positioned near a round wire attached to a locking pin that is inserted into a fastener hold on an arm of a truck hitch; engaging the keeper module with the round wire such that the round wire fits into crenellations engages with a magnet located within a recessed cavity within the keeper module; and manipulating the round wire so as to remove locking pin from the arm of the hitch.

Devices according to embodiments of the present general inventive concept enable users to remove and/or insert a locking pin for a truck hitch without requiring the user to enter the bed of the truck, to climb over the side of the truck, or to use a step ladder.

BRIEF DESCRIPTION OF THE DRAWING FIGURES

The above-mentioned and additional features of the invention will become more clearly understood from the following detailed description of the invention read together with the drawings in which.

Figure 5A:
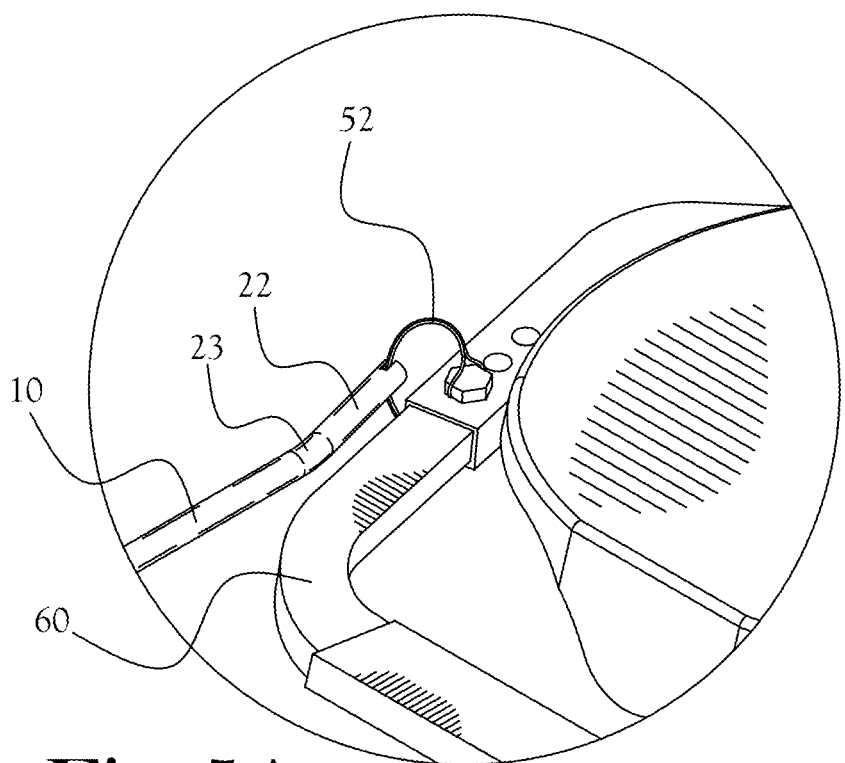
FIG. 5A is a first close-up view of the example embodiment truck hitch extension pole manipulator in use, showing the locking pin of the hitch in a first state, inserted in the hitch arm.
Figure 5B:
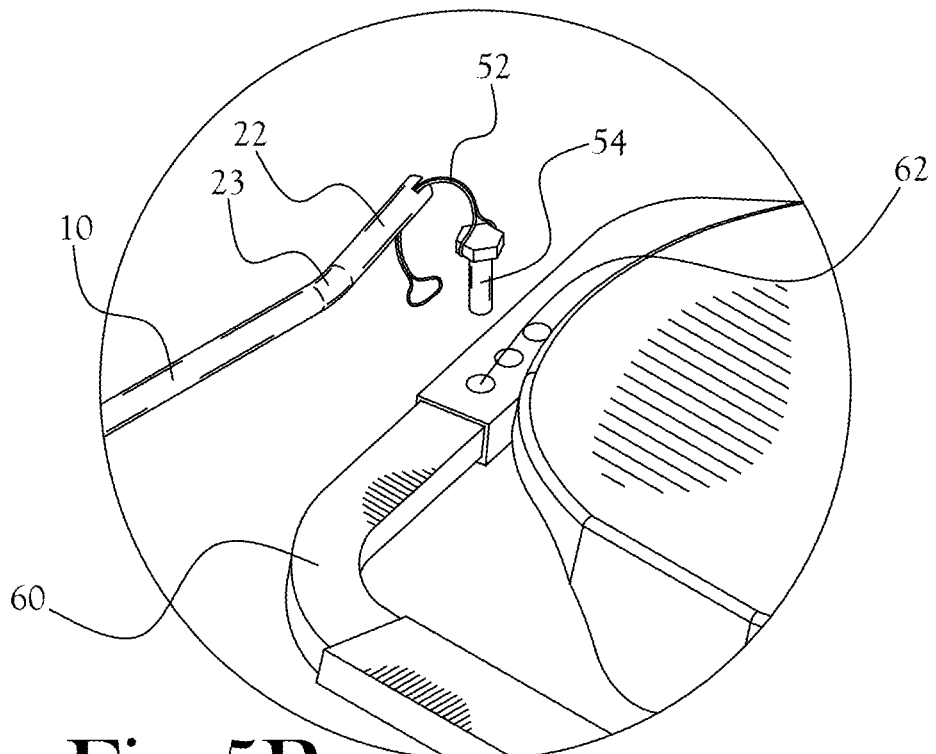

FIG. 5B is a second close-up view of the example embodiment truck hitch extension pole manipulator in use, showing the locking pin of the hitch in a second state, removed from the hitch arm and the hitch; and FIG. 6 is a perspective view of a truck hitch extension pole manipulator according to another example embodiment of the present general inventive concept, showing an embodiment with a bend of approximately ninety degrees in the handle.

DETAILED DESCRIPTION

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Figure 1:
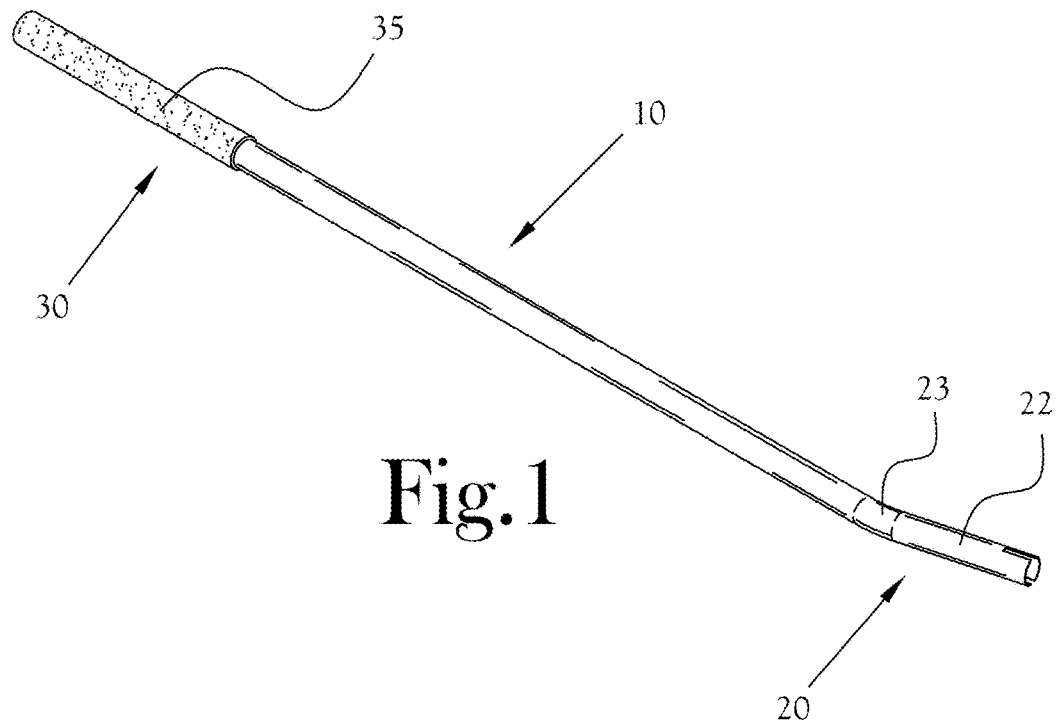
FIG. 1 is a perspective view of a truck hitch extension pole manipulator according to one example embodiment of the present general inventive concept.
Figure 2:
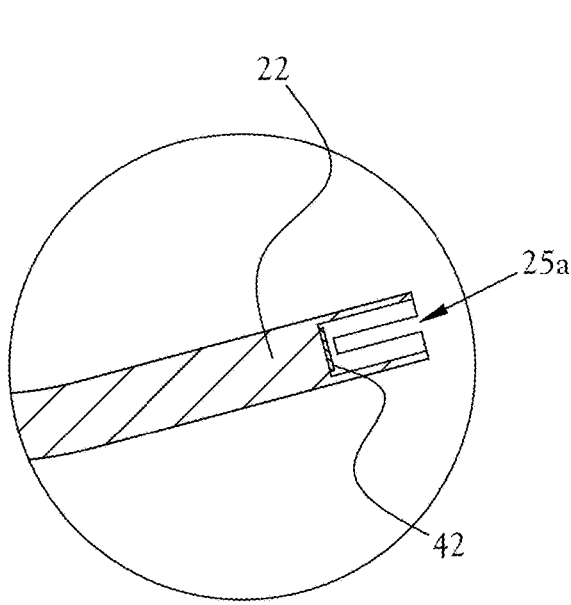
FIG. 2 is a section view of the proximal end of the truck hitch extension pole manipulator shown in FIG. 1.
Figure 3:
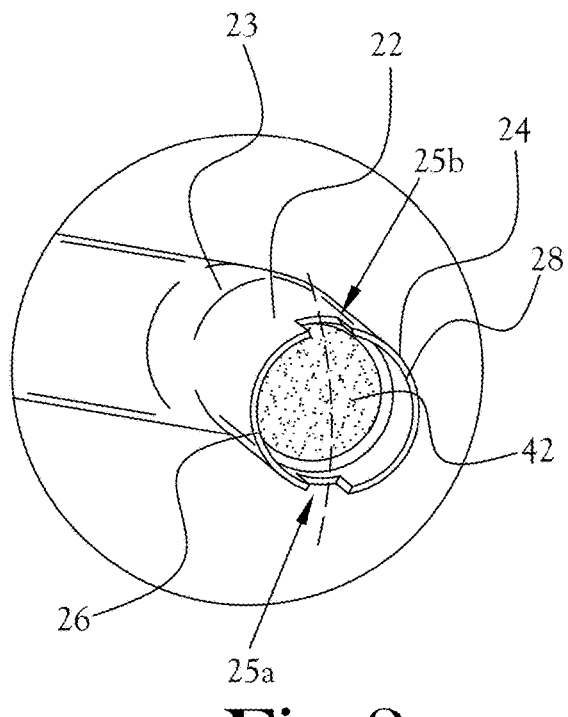
FIG. 3 is a close-up perspective view of the proximal end of the example embodiment truck hitch extension pole manipulator shown in FIGS. 1 and 2, showing the magnet and the crenellated lip of the manipulator or keeper module.

Turning to the Figures, FIG. 1 shows a perspective view of a truck hitch extension pole manipulator or ("HITCH BUDDY"™) according to one example embodiment of the present general inventive concept. As shown in FIG. 1, the truck hitch extension pole manipulator 10 includes an elongated body with a proximal end 20 and a distal end 30. The distal end 30 generally encompasses a handle 35, while the proximal end 20 generally includes a "keeper" module 22 configured to interact with, for example, a locking pin on a truck hitch. In some embodiments, the proximal end 20 of the truck hitch extension pole manipulator 10 includes a slight bend 23 (generally not more than 15 degrees from the axis of the main body of the truck hitch extension pole manipulator 10); the bend 23 is configured to assist a user in positioning the keeper module 22 proximate a locking pin of a truck hitch, as described below. As shown in the section view of the proximal end 20 of the truck hitch extension pole manipulator 10 shown in FIG. 2 and in the close-up perspective view in FIG. 3, the keeper module 22 includes a raised lip 24 partially or mostly surrounding a recessed cavity, with a magnet 42 positioned at the base of the recessed cavity. In the illustrated example embodiment, the raised lip 24 comprises two segments 26 and 28, separated from one another by two gaps or crenellations 25a and 25b on opposing sides of the raised lip 24. As indicated by the curved dashed line in FIG. 3, the two crenellations 25a and 25b are intentionally offset from being precisely opposite one another across the diameter of the circumference defined by the raised lip 24; that is, the angle between the center of crenellation 25a and the center of crenellation 25b is substantially less than 180 degrees.

Figure 4:
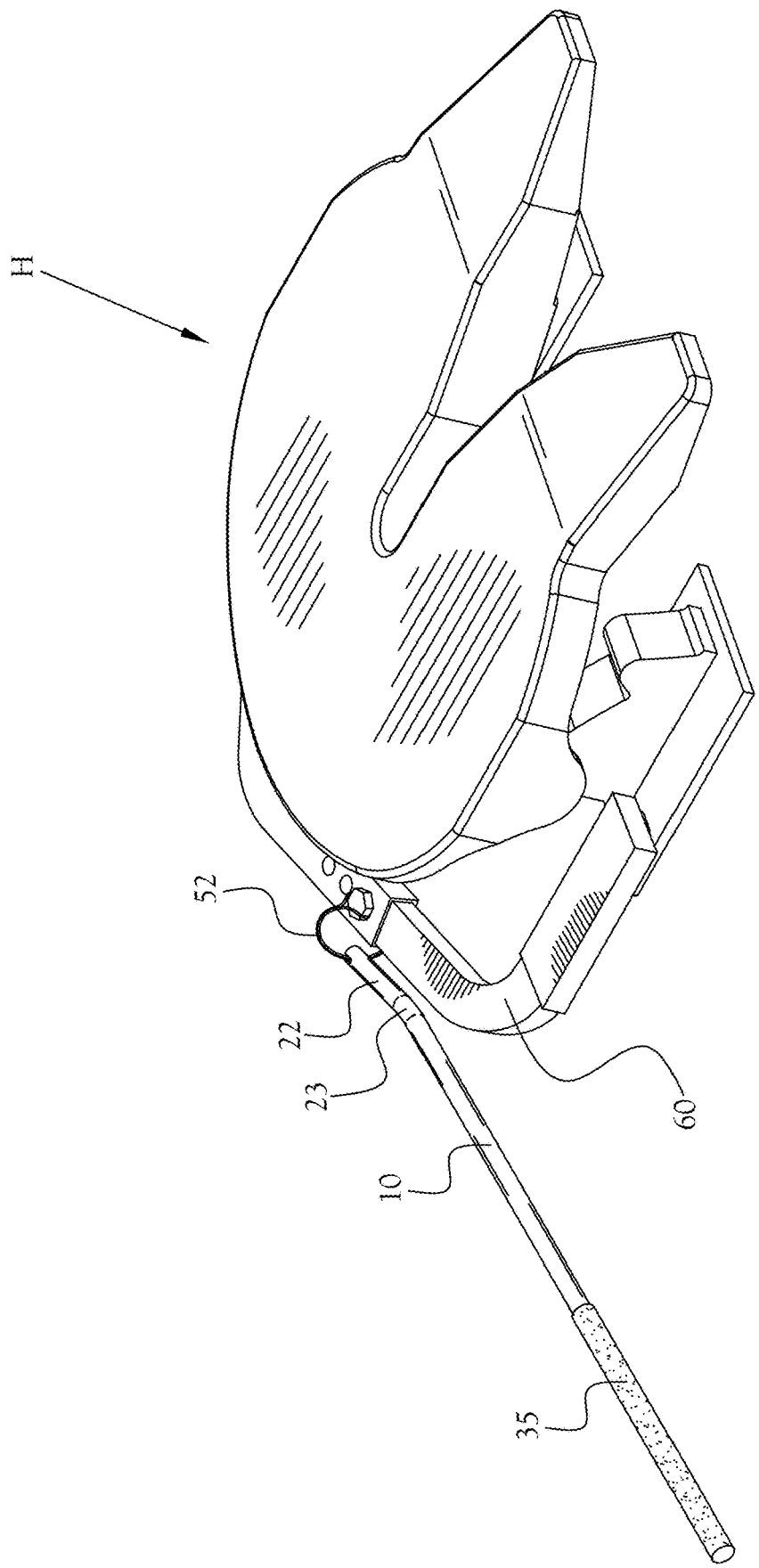
FIG. 4 is a perspective view showing the example embodiment truck hitch extension pole manipulator shown in the previous Figures being used with a truck hitch.

FIGS. 4, 5A, and 5B illustrated how the illustrated example embodiment is used in practice. FIG. 4 is a perspective view showing the illustrated example embodiment truck hitch extension pole manipulator being used with a truck hitch. As shown in FIG. 4 and in the close-up views in FIGS. 5A and 5B, a user positions the truck hitch extension pole manipulator 10 such that the keeper module 22 is positioned near a round wire 52 attached to a locking pin 54 that is inserted into a fastener hold on an arm 60 of a truck hitch H. The keeper module 22 engages with the round wire 52 (which typically is fabricated from a ferromagnetic or paramagnetic material or from an alloy that includes at least one ferromagnetic or paramagnetic material); the round wire 52 fits into the crenellations 25a and 25b and engages with the magnet 42 located within the recessed cavity within the keeper module 22. Having secured the round wire 52, and using the truck hitch extension pole manipulator 10, a user may then manipulate the round wire 52 so as to remove locking pin 54 from the arm 60 of the hitch H, as shown in FIG. 5B.

Generally, the width of the crenellations 25a and 25b is adequate to allow engagement with the width or diameter of a round wire of hitch locking pin (generally ⅜ inch or ¼ inch). In some embodiments, the keeper module 22 and some portion of the proximal end 20 of the truck hitch extension pole manipulator 10 comprise rubber so as to avoid damage to a truck. In some embodiments, the recessed cavity of the keeper module 22 is approximately ½ inch deep (measured from the edge of the raised lip to outboard surface of the magnet or to the bottom of the recessed cavity, as desired). In general, the keeper module 22 has a diameter of approximately ¾ inches.

FIG. 6 is a perspective view of a truck hitch extension pole manipulator according to another example embodiment of the present general inventive concept, showing an embodiment with a handle bend of approximately ninety degrees (90°). As shown in FIG. 6, the truck hitch extension pole manipulator 12 includes an elongated body with a proximal end 20 and a distal end 30. The distal end 30 includes a handle 36 with a ninety-degree bend, while the proximal end 20 includes a keeper module 22 as discussed above. The illustrated example embodiment, along with similar embodiments, is configured to allow a user to interact with a locking pin on a truck hitch and also to allow a user to grab a release arm to open jaws that release the hitch. Numerous variations, modification, and additional embodiments are possible, and, accordingly, all such variations, modifications, and embodiments are to be regarded as being within the spirit and scope of the present general inventive concept.

As discussed, in some embodiments, the elongated body or rod includes a bend proximate the keeper module, the bend configured to configured to assist a user in positioning the keeper module proximate the locking pin. In some embodiments, the bend is approximately 15 degrees. In some embodiments, the bend is less than 16 degrees. In some embodiments, the bend is approximately 10 degrees. In some embodiments, the bend is between approximately 10 degrees and approximately 13 degrees. In some embodiments, the bend is between approximately 10 degrees and approximately 14 degrees. Numerous variations, modification, and additional embodiments are possible, and, accordingly, all such variations, modifications, and embodiments are to be regarded as being within the spirit and scope of the present general inventive concept.

In some embodiments, the magnet is a cylindrical body. In some embodiments, the magnet is fabricated from a rare earth metal. Some embodiments include a segment of wood positioned behind the magnet.

In some embodiments, the truck hitch extension pole manipulator is approximately 40 inches long. In some embodiments, the truck hitch extension pole manipulator is approximately 48 inches long. In some embodiments, the truck hitch extension pole manipulator is approximately 40-48 inches long. In some embodiments, the truck hitch extension pole manipulator is approximately 40-50 inches long.

Devices according to embodiments of the present general inventive concept enable users to remove and/or insert a locking pin for a truck hitch without requiring the user to enter the bed of the truck, to climb over the side of the truck, or to use a step ladder.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A truck hitch extension pole manipulator, comprising:
an elongated body with a proximal end and a distal end, the proximal end including a keeper module configured to interact with a locking pin on a truck hitch;
the keeper module including a raised lip partially or mostly surrounding a recessed cavity, with a magnet positioned at the base of the recessed cavity, the magnet configured to interact with the locking pin, the raised lip including two segments separated from one another by two crenellations on opposing sides of the raised lip.

2. The truck hitch extension pole manipulator of claim 1, wherein the magnet is configured to engage with a round wire attached to the locking pin of the truck hitch.

3. The truck hitch extension pole manipulator of claim 1, wherein the segments of the raised lip of the keeper module are configured to engage with a round wire attached to the locking pin of the truck hitch.

4. The truck hitch extension pole manipulator of claim 3, wherein the segments of the raised lip of the keeper module have a width sufficient to receive a diameter of the round wire attached to the locking pin of the truck hitch.

5. The truck hitch extension pole manipulator of claim 1, wherein the keeper module includes components that include rubber.

6. The truck hitch extension pole manipulator of claim 1, wherein the keeper module includes components fabricated from an elastic material.

7. The truck hitch extension pole manipulator of claim 1, wherein the elongated body includes a bend proximate the keeper module, the bend configured to configured to assist a user in positioning the keeper module proximate the locking pin.

8. A truck hitch extension pole manipulator, comprising:
an elongated rod with a proximal end and a distal end, the proximal end including a keeper module configured to interact with a locking pin on a truck hitch;
the keeper module including a raised lip partially or mostly surrounding a recessed cavity, with a magnet positioned near the base of the recessed cavity, the magnet configured to engage with the locking pin, the raised lip including two segments separated from one another by two crenellations of the raised lip.

9. The truck hitch extension pole manipulator of claim 8, wherein the elongated rod includes a bend proximate the keeper module, the bend configured to configured to assist a user in positioning the keeper module proximate the locking pin.

10. The truck hitch extension pole manipulator of claim 9, wherein the bend is approximately 15 degrees.

11. The truck hitch extension pole manipulator of claim 9, wherein the bend is less than 16 degrees.

12. The truck hitch extension pole manipulator of claim 8, wherein the magnet is configured to engage with a round wire attached to the locking pin of the truck hitch.

13. The truck hitch extension pole manipulator of claim 8, wherein the segments of the raised lip of the keeper module are configured to engage with a round wire attached to the locking pin of the truck hitch.

14. The truck hitch extension pole manipulator of claim 13, wherein the segments of the raised lip of the keeper module have a width sufficient to receive a diameter of the round wire attached to the locking pin of the truck hitch.

15. The truck hitch extension pole manipulator of claim 8, wherein the keeper module includes components that include rubber.

16. The truck hitch extension pole manipulator of claim 8, wherein the keeper module includes components fabricated from an elastic material.

17. A method for removing a locking pin from a truck hitch, comprising:

provuding a truck hitch extension pole manipulator including an elongated rod with a proximal end and a distal end, the proximal end including a keeper module configured to interact with the locking pin, the keeper module including a raised lip partially or mostly surrounding a recessed cavity, with a magnet positioned near the base of the recessed cavity, the magnet being configured to engage with the locking pin, the raised lip including two segments and separated from one another by two crenellations of the raised lip;

positioning the truck hitch extension pole manipulator such that a keeper module is positioned near a round wire attached to a locking pin that is inserted into a fastener hold on an arm of a truck hitch;

engaging the keeper module with the round wire such that the round wire fits into crenellations engages with a magnet located within a recessed cavity within the keeper module; and manipulating the round wire so as to remove locking pin from the arm of the hitch.

\* \* \* \* \*